Aug. 12, 1952     T. L. DOLAN     2,606,341
MEAT TENDERER

Filed Sept. 29, 1947     2 SHEETS—SHEET 1

Inventor

Terrance L. Dolan

By *Clarence A. O'Brien and Harvey B. Jacobson*
Attorneys

Aug. 12, 1952     T. L. DOLAN     2,606,341
MEAT TENDERER
Filed Sept. 29, 1947                    2 SHEETS—SHEET 2
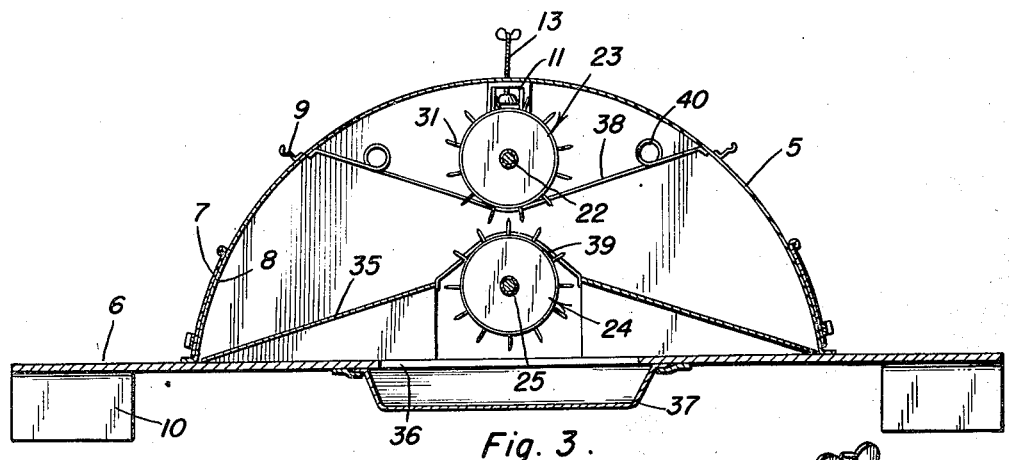
Fig. 3.
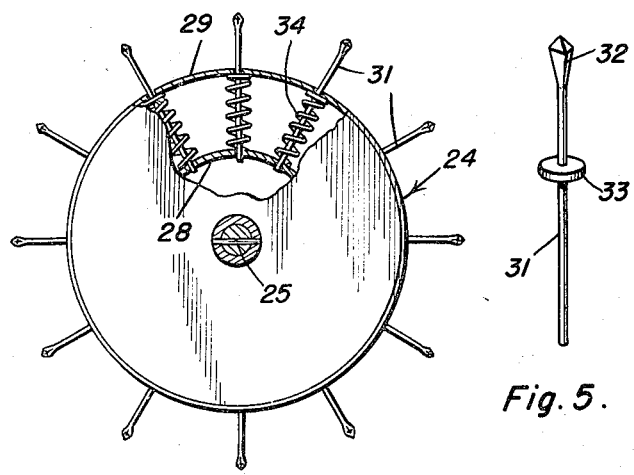
Fig. 4.
Fig. 5.
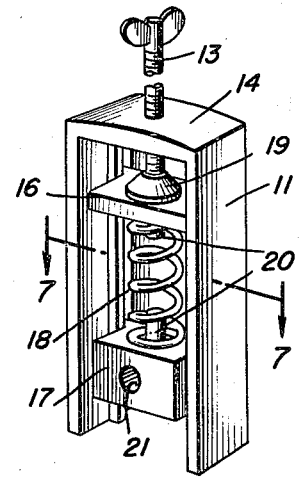
Fig. 6.
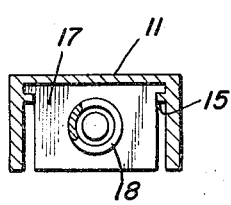
Fig. 7.
Inventor
Terrance L. Dolan
By *Clarence A. O'Brien and Harvey B. Jacobson*
Attorneys Patented Aug. 12, 1952

2,606,341

UNITED STATES PATENT OFFICE 2,606,341

MEAT TENDERER

Terrance L. Dolan, Albuquerque, N. Mex.

Application September 29, 1947, Serial No. 776,720

3 Claims. (Cl. 17—26)

The present invention relates to new and useful improvements in meat tenderers and more particularly to the provision of a pair of meat tenderizing rollers between which steaks are fed, the rollers having prongs or spikes for penetrating the meat to improve the quality thereof.

An important object of the invention is to provide means for yieldably mounting the spikes in the rollers to prevent damage thereto when encountering bones in the meat.

A further object is to provide roller cleaners to prevent clinging of the meat to the rollers and arranging the cleaners in a housing for the rollers to feed the meat to and from the rollers.

A still further object is to provide a device of this character of simple and practical construction, which is efficient and reliable in operation, relatively inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 3 is a longitudinal sectional view on a reduced scale taken on a line 3—3 of Figure 2;

Figure 4 is a sectional view on an enlarged scale taken on a line 4—4 of Figure 2;

Figure 5 is a perspective view of one of the tenderizing spikes;

Figure 6 is a perspective view of one of the floating bearings for the rollers; and Figure 7 is a sectional view taken on a line 7—7 of Figure 6.

Figure 1:
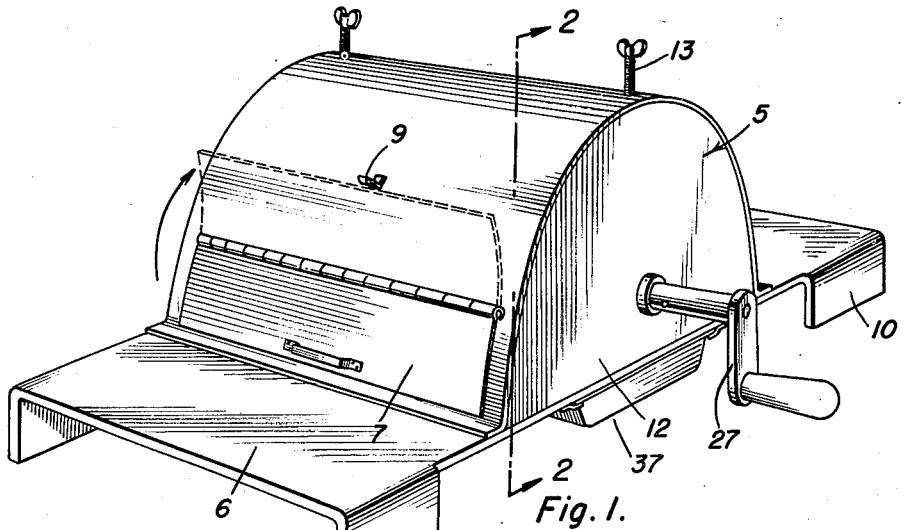
Figure 1 is a perspective view.
Figure 2:
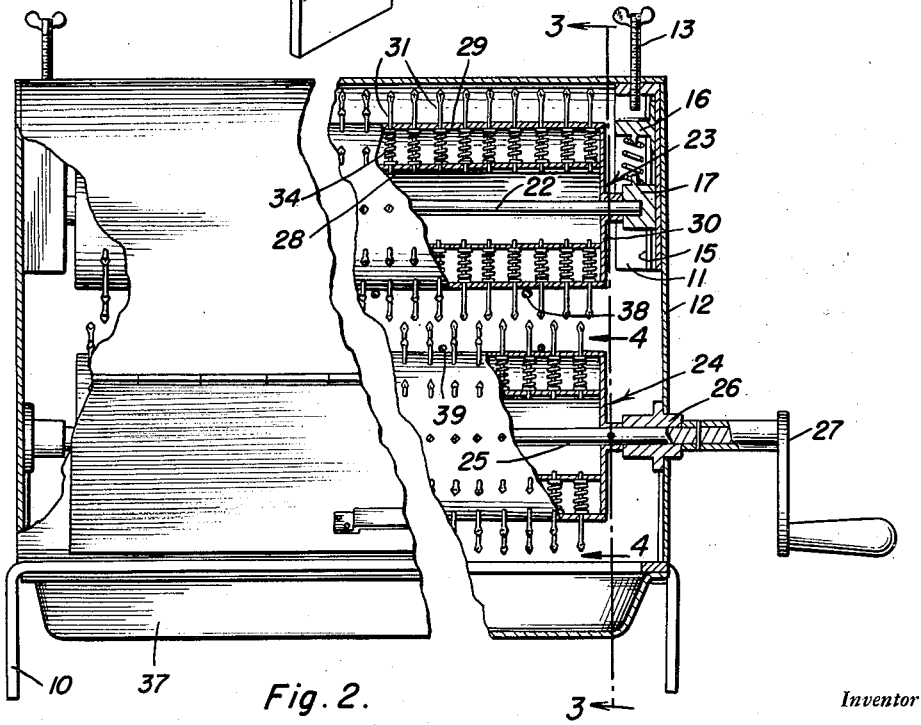
Figure 2 is an enlarged end elevational view with parts broken away and shown in section, the parts shown in section being along the line 2—2 of Figure 1.

Referring now to the drawings in detail, wherein for the purpose of illustration I have disclosed a preferred embodiment of my invention, the numeral 5 designates a semi-cylindrical housing positioned horizontally and having aprons 6 extending outwardly at each side edge. Doors 7 are hinged at their upper edges to the sides of the housing to close openings 8 therein. The doors may be held in an open raised position by catches 9.

The aprons 6 are formed with downturned flanges 10 at their side edges to provide legs for supporting the housing in an elevated position on a table or other work surface (not shown).

A channel shaped bearing guide 11 is secured in a vertical position to the inner side of the end walls 12 of the housing at the upper portion thereof by a vertically adjustable screw 13 threaded through the top of the housing and through the top 14 of the guide, the guide having vertical ribs 15 on the opposed inner sides thereof on which upper and lower blocks 16 and 17 are slidably mounted with a coil spring 18 positioned between the blocks and spacing them vertically from each other. The upper block 16 is engaged by a head 19 on the lower end of screw 13 and the opposed faces of the blocks are formed with pins 20 to hold the ends of the spring in position.

The lower blocks 17 at each end of the housing are formed with recesses 21 in which the ends of a shaft 22 are journaled, the shaft having an upper roller 23 secured thereto. A lower roller 24 is secured to a shaft 25 journaled in bearings 26 in the ends of the housing, one end of shaft 25 projecting outwardly and having a handle 27 secured thereto.

The upper and lower rollers 23 and 24 are of duplicate construction and accordingly, a detailed description of one will suffice for both. Each roller comprises inner and outer cylinders 28 and 29 secured to end plates 30, the inner cylinder being substantially smaller in diameter to space the cylinders apart one within the other. A plurality of tenderizing spikes 31 are slidable radially in the cylinders, and each spike includes a sharpened or pointed head 32 at its outer end and a flange 33 inwardly thereof and held against the inner surface of the outer cylinder by a coil spring 34 positioned on the spike between the flange and the inner cylinder. The spring normally projects the spike outwardly of the outer cylinder.

Extending inwardly from the bottom of each opening 8 in the sides of the housing and inclined upwardly toward the lower roller 24 are ramps 35 on either of which steaks or other meat to be tenderized are fed for passage between the rollers whereupon the spikes 31 will penetrate the meat.

An opening 36 is formed in the bottom of the housing beneath the rollers and under the opening 36 is removably supported a pan 37 for collecting juices from the meat.

Wire roller cleaning rods 38 and 39 extend transversely of the respective upper and lower rollers 23 and 24 at their opposed sides and between the spikes of the rollers, the upper cleaning rods having their ends welded or otherwise suitably secured to the upper portion of housing 5 and the lower cleaning rods secured to the ends of ramps 35. The upper rods 38 are formed with coils 40 to compensate for the vertical movement of the upper roller when meat of various thicknesses passes between the rollers and to keep the cleaning rods working closely against the outer cylinder of the upper roller.

In the operation of the device, meat is placed in the opening at either side of the housing 5 and is moved upwardly along the ramp 35 where it is gripped by the spikes 31 and drawn between the tenderizing rollers 23 and 24 upon rotation of the lower roller in a desired direction by the handle 27. The upper roller is rotated by the movement of the meat when passing between the rollers.

The spikes 31 penetrate and perforate the meat in a tenderizing action and the spikes are retracted to compensate for variations in the thickness of the meat or when encountering bones. The upper roller 23 also adjusts itself automatically to variations in the thickness of the meat and is adjusted relative to the lower roller by the screw 13.

In view of the foregoing description taken in conjunction with the accompanying drawings it is believed that a clear understanding of the construction, operation and advantages of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

1. A meat tenderer comprising upper and lower co-acting rollers between which the meat is fed, tenderizing elements projecting radially from the rollers, stationary cleaning rods positioned between the tenderizing elements of each roller at the coacting sides of the latter, and spring biased bearings for one of the rollers to automatically adjust said one roller relative to the other roller to compensate for variations in thickness of the meat, the cleaning rods of said one roller including spring biasing means and supporting the roller against the tension subjected to said bearings.

2. A meat tenderer comprising a housing having openings in opposite sides for the feeding and delivery of meat to and from the housing, upper and lower co-acting rollers rotatably mounted in the housing, tenderizing spikes projecting radially from the rollers, bearings for the ends of the upper roller, means supporting the bearings in the housing for vertical adjustment, spring means opposing an upward movement of the bearings, stationary resilient cleaning rods positioned between the tenderizing spikes of the upper roller, each of said cleaning rods including a spring coil opposing the action of said spring means, and operating means for the lower roller.

3. A meat tenderer comprising upper and lower coacting tenderizing rollers between which the meat is fed, and combined resilient hanger and cleaning rods supporting the upper roller and extending under the upper roller to rotatably support the same in scraping contact therewith.

TERRANCE L. DOLAN.

REFERENCES CITED

The following references are of record in the file of this patent:

UNITED STATES PATENTS

| Number | Name | Date |
|---|---|---|
| 48,072 | Jones | June 6, 1865 |
| 110,111 | Bringman | Dec. 13, 1870 |
| 347,651 | Sharp | Aug. 17, 1886 |
| 411,169 | Schmidt | Sept. 17, 1889 |
| 440,635 | Hunter | Nov. 18, 1890 |
| 681,266 | Roop | Aug. 27, 1901 |
| 1,104,431 | Lint | July 21, 1914 |
| 1,982,487 | Swift | Nov. 27, 1934 |

FOREIGN PATENTS

| Number | Country | Date |
|---|---|---|
| 9,007 | Sweden | June 4, 1898 |